United States Patent [19]

Matsushita et al.

[11] Patent Number: 4,870,633

[45] Date of Patent: Sep. 26, 1989

[54] APPARATUS FOR REPRODUCING INFORMATION RECORDED ON A RECORDING MEDIUM

[75] Inventors: Machiko Matsushita, Yokohama; Akio Aoki, Tokyo; Kazuo Minoura, Yokohama, all of Japan

[73] Assignee: Canon Kabushiki Kaisha, Tokyo, Japan

[21] Appl. No.: 253,883

[22] Filed: Oct. 5, 1988

Related U.S. Application Data

[63] Continuation of Ser. No. 864,539, May 19, 1986, abandoned.

[30] Foreign Application Priority Data

May 28, 1985 [JP] Japan ................................. 60-115771

[51] Int. Cl.$^4$ .......................... G11B 7/00; G06K 19/00
[52] U.S. Cl. ......................................... 369/47; 369/32; 369/33; 369/48; 369/59; 360/27; 235/454; 235/487
[58] Field of Search ........................ 360/3, 18, 27, 51; 369/32, 33, 121, 50, 59, 47–51, 100, 107, 109; 235/454, 487, 468, 494; 346/76 L

[56] References Cited

U.S. PATENT DOCUMENTS

| | | | |
|---|---|---|---|
| 3,902,010 | 8/1975 | Goshima | 369/18 |
| 4,542,288 | 9/1985 | Drexler | 235/487 |
| 4,544,835 | 10/1985 | Drexler | 235/487 |
| 4,724,492 | 2/1988 | Kosaka et al. | 369/49 X |

Primary Examiner—Robert L. Richardson
Attorney, Agent, or Firm—Fitzpatrick, Cella, Harper & Scinto

[57] ABSTRACT

An information reproducing system is disclosed. This system is arranged such that information is read out from a recording medium having different types of first and second items of information and is output in the form of a signal. The waveform of the output signal is shaped and supplied as a reproduced signal. In the above-mentioned signal processing, this information reproducing system is adapted to control the shaping of the signal waveform in accordance with each type of information to be read out from the recording medium.

19 Claims, 6 Drawing Sheets

APPARATUS FOR REPRODUCING INFORMATION RECORDED ON A RECORDING MEDIUM

This application is a continuation of application Ser. No. 864,539 filed May, 19, 1986, now abandoned.

BACKGROUND OF THE INVENTION

1. Field of the Invention

The present invention relates to a system for reproducing information which is recorded on a recording medium.

2. Description of the Prior Art

A system is well known in which information is recorded on and read out from a recording medium by utilizing a beam of light. Various types of recording mediums such as discs, cards, tapes and the like may be employed in this system. In particular, a card-shaped optical recording medium (hereinafter referred to as an "optical card") can be formed in a small-size, lightweight and portable medium having a large storage capacity. Therefore, the demand for this type of medium has increased.

The recording of information on the optical card is practiced in the following manner. A light beam is modulated in accordance with information to be recorded and the modulated beam is converged in the form of a minute beam spot. The thus-converged beam is caused to scan the surface of the card, whereby the information is recorded on the card in the form of a row of recording pits (i.e., an information track) which is optically detectable.

In the case of the above-mentioned procedure for information recording, it is necessary to perform accurate recording and reproduction of information without involving any trouble such as a light beam crossing the information track. To this end, in general, a track guide for facilitating automatic tracking, clock signals used for correcting variations in velocity during a recording operation, and a track number for seeking a desired track are disposed in advance adjacent to each of the information tracks as a guide means. According to this arrangement, at the time of reproduction the clock signals and the track number are reproduced, and the signals thus obtained are binary-coded into digital signals. On the basis of the digital signals, desired data is reproduced from a predetermined information track and the reproduced data is extracted in the form of binary-coded information.

As a typical conventional case, the predetermined arrangement of the track guides, the clock signals and the track numbers on a medium (i.e., preformat) has been effected at an intermediate point in the course of the manufacture of the recording medium. However, occasionally the reproduced characteristics of the preformatted information are different from the characteristics obtained from the reproduction of the information recorded by another recording/reproducing system, so that if the clock signals, the track numbers and recorded data are to be read out by an identical means used in common, it is impossible accurately to reproduce information.

Figure 5:
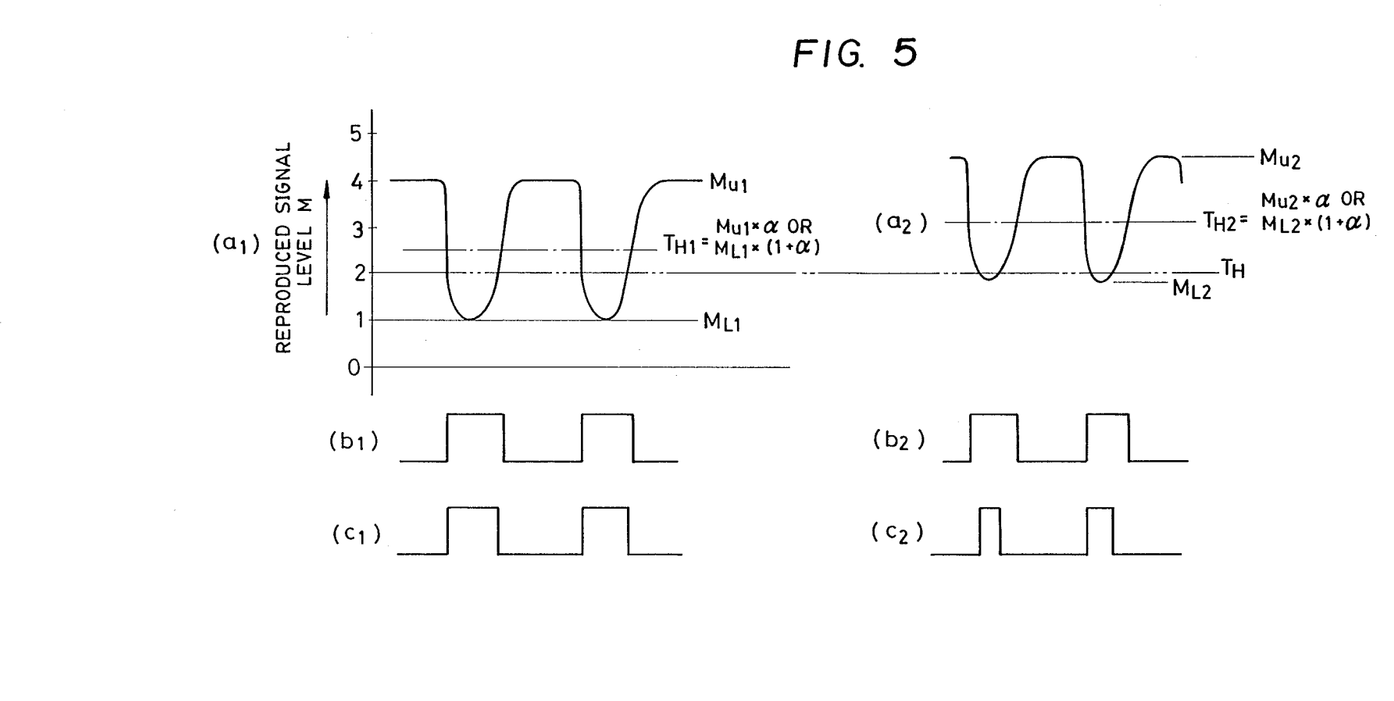
Figure 6:
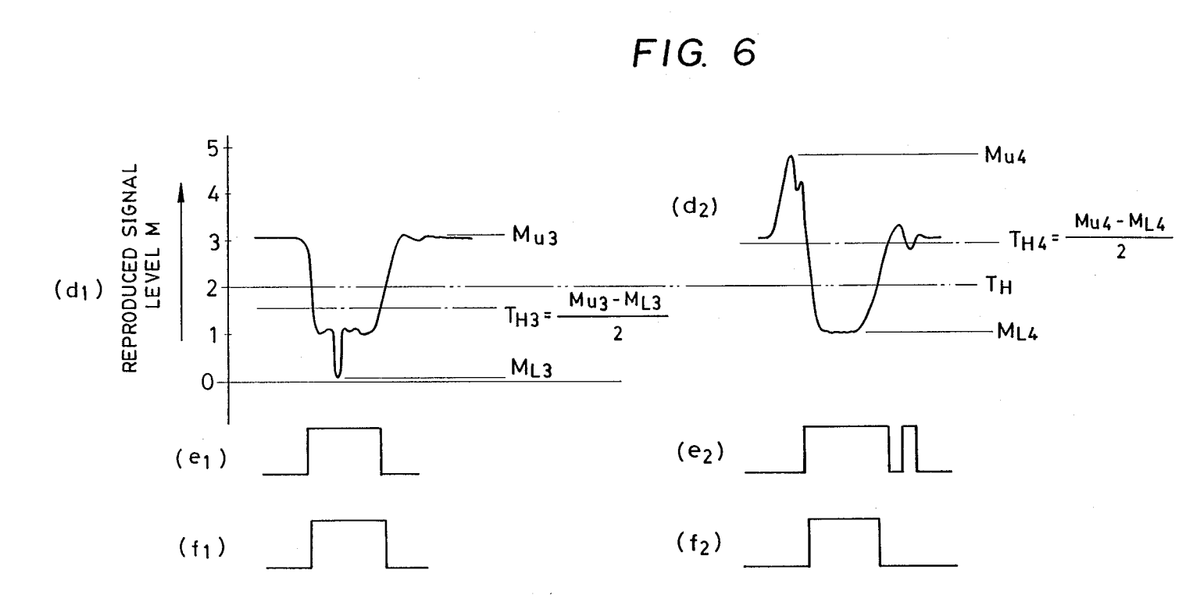

In case of the optical card, preformatting is practiced by photo-lithography, and when information is to be recorded by a recording system, a laser beam is irradiated on a medium and record pits are formed thereon by heat. In terms of optical properties, the former is of a phase type in which variations are detected in the quantity of light caused by scattered reflection, and the latter is of a reflection type in which variations are detected in the quantity of light caused by the difference in reflectivity. Therefore, as shown in FIGS. 5($a_1$) and 6($d_1$), each type exhibits a different reproduced waveform. FIG. 5($a_1$) shows an example of the waveform obtained by the reproduction of the preformatted portion, and FIG. 6($d_1$) shows that obtained by the reproduction of one of the record pits.

Even in the case of a waveform obtained by the reproduction of preformat, as shown in FIG. 5($a_2$), a level difference occurs due to the individual differences of each medium. Similarly, the reproduced waveform of each record pit occasionally undergoes distortion since a non-uniform portion is formed in the vicinity of the boundary portion defining the record pit or at the bottom of any of the pits owing to the individual differences of each medium or to variations in the focused state of a laser beam during a recording operation.

For this reason, if binary-coding is to be carried out by an identical means, a readout margin may be damaged, leading to difficulties such as an inferior S/N ratio and erroneous reproduction.

SUMMARY OF THE INVENTION

Accordingly, it is an object of the present invention to provide an improved information reproducing system which eliminates the above-described disadvantages.

It is another object of the present invention to provide an information reproducing system which enables binary-coding without any substantial error even in the face of variations in the waveform of a reproduced signal or changes in the level of a reproduced signal caused by the individual characteristics of a medium.

The above and other objects, features and advantages of the present invention will become apparent from the following description of the preferred embodiment thereof and the appended claims, taken in conjunction with the accompanying drawings.

BRIEF DESCRIPTION OF THE DRAWINGS

FIGS. 4($a$) and 4($b$) are block diagrams showing the constructions of signal-reproducing sections incorporated in the system of the present invention, respectively;

FIGS. 5($a_1$) and 5($a_2$) show the reproduced waveform of the preformatted portion, respectively, and FIGS. 5($b_1$), 5($b_2$), 5($c_1$) and 5($c_2$) show the binary-coded outputs of the waveforms illustrated in the FIGS. 5($a_1$) and 5($a_2$);

FIGS. 6($d_1$) and 6($d_2$) show the waveforms obtained by the reproduction of a record pit, respectively, and FIGS. 6($e_1$), 6($e_2$), 6($f_1$) and 6($f_2$) show the output waveforms obtained by the binary-coding of the waveforms shown in FIGS. 6($d_1$) and 6($d_2$)

DESCRIPTION OF THE PREFERRED EMBODIMENT

One preferred embodiment of the present invention will be described below with reference to the accompanying drawings.

Figure 1:
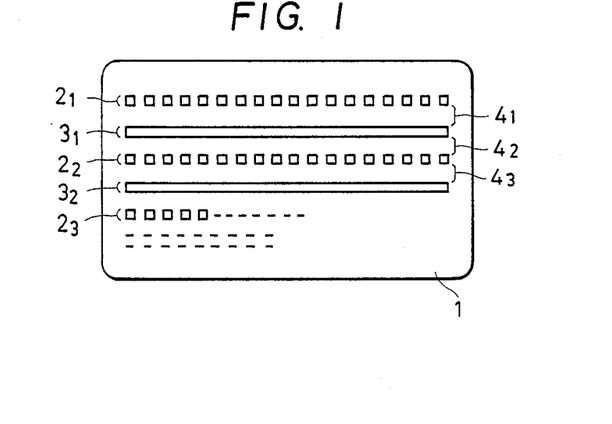
FIG. 1 is a schematic plan view showing an optical card to which the present invention can be adapted.

Referring to FIG. 1 which is a schematic plan view of an optical card to which the present invention can be adapted, an optical card 1 has a plurality of clock tracks $2_1$ to $2_n$ on which clock signals are prerecorded and which are formed in the shape of an intermittent broken line, respectively, and a plurality of tracking tracks $3_1$ to $3_n$ which are respectively formed in the shape of a continuous line. These tracks are alternately disposed at equal intervals on the card 1, and in addition, between these tracks are disposed recording regions $4_1$ to $4_n$ on which information is recorded. In other words, the optical card 1 has recording regions (i.e., data tracks) $4_1$ to $4_n$ in the regions between the respective clock tracks $2_1$ to $2_n$ and the corresponding tracking tracks $3_1$ to $3_n$. Also, data on the number of each track is preformatted at the first position of the respective clock tracks $2_1$ to $2_n$.

Figure 2:
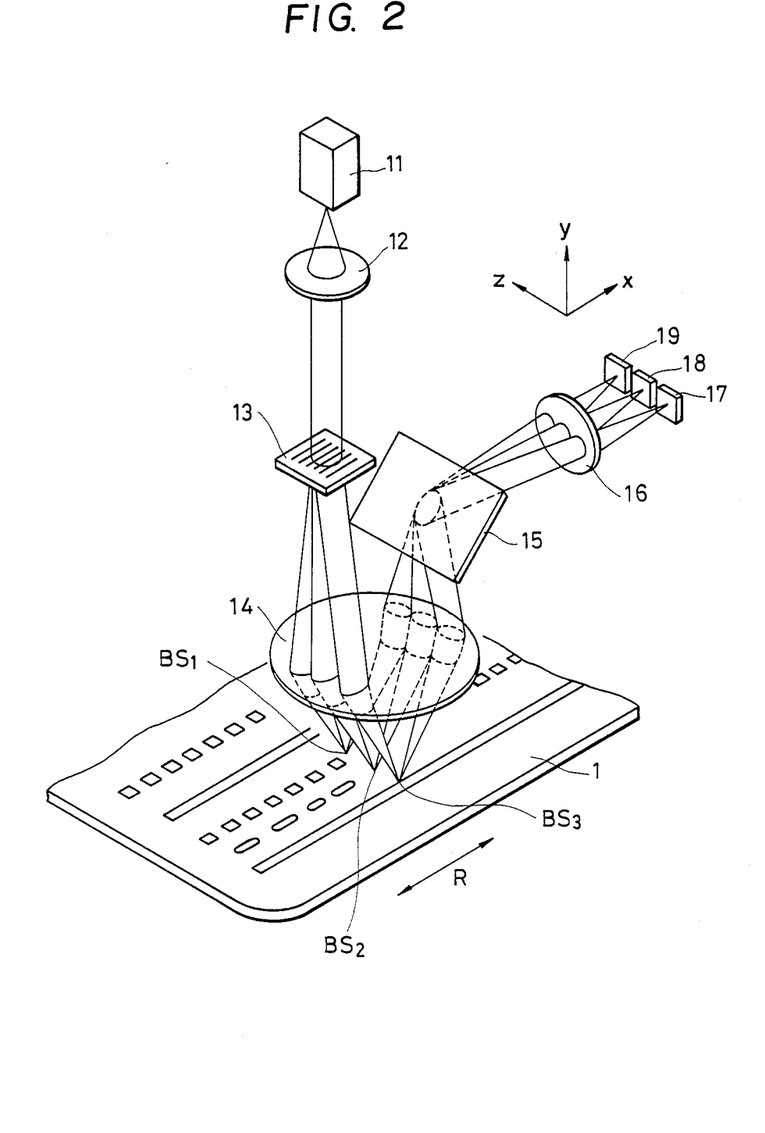
FIGS. 2 and 3 are schematic views in perspective and in side elevation, respectively, showing the construction of one embodiment of the system in accordance with the present invention.
Figure 3:
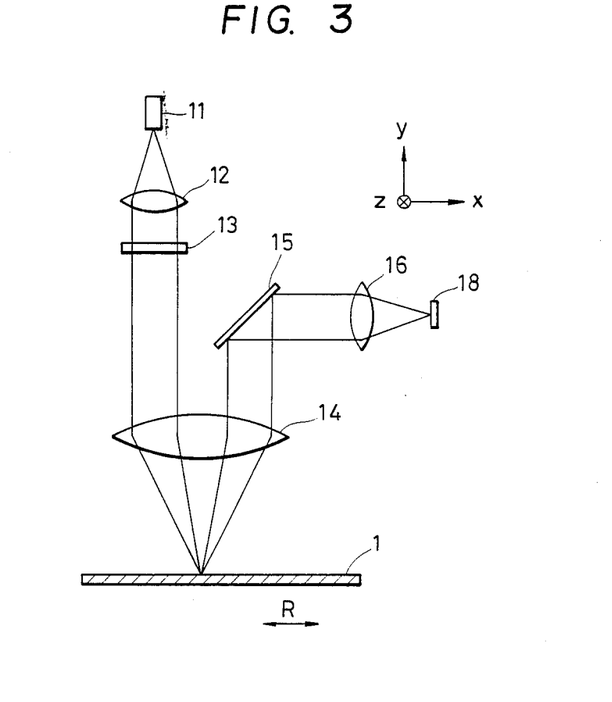

FIGS. 2 and 3 are respectively a perspective view and a side sectional view of the construction of an optical information recording/reproducing system for recording and reproducing information on the optical card 1, which system incorporates one embodiment of the present invention. In FIGS. 2 and 3, a laser beam emanates from a light source 11 such as a semiconductor laser, and, when the beam passes through the collimator lens 12, it is collimated. The collimated beam is divided into three beams by a diffraction grating 13. The three beams pass through an objective lense 14 and are focused on the optical card 1 shown in FIG. 1, thereby forming beam spots $BS_1$, $BS_2$, and $BS_3$, as shown in FIG. 2. Subsequently, a drive means (not shown) causes the optical card 1 to travel in either of the directions of the double-headed arrow R, and the beam spots $BS_1$, $BS_2$, and $BS_3$ are shifted in the longitudinal directions of the tracking tracks $3_1$ to $3_n$ and the clock tracks $2_1$ to $2_n$ in correspondence with the magnitude of the travel of the card 1, thereby continuing a scanning operation.

In the meantime, the aforementioned three beams are reflected from the beam spots $BS_1$, $BS_2$, and $BS_3$, and again pass through the objective lense 14, thus striking a mirror 15. The mirror 15 reflects the beams toward a condenser lens 16, and they are projected from the condenser lens 16 onto photodetectors 17, 18 and 19 which are disposed in a focal plane of the beam.

FIGS. 5($a_1$) and 5($a_2$) show examples of the waveforms of the reproduced signal levels obtained by the reproduction of the preformatted portion. These examples show that the mean level of each of the signals reproduced from the flat and pit portions formed on the surface of the recording medium are varied due to the individual characteristics of each medium. FIGS. 5($b_1$) and 5($b_2$) show binary-coded waveforms obtained when a binary-coded decision level is set on the basis of a value equivalent to $\alpha$ ($0 < \alpha < 1$) times the upper limit of the mean reproduced level of the flat portion or that equivalent to $(1+\alpha)$ times the lower limit of the mean reproduced level of the pit portion. FIGS. 5($c_1$) and 5($c_2$) show binary-coded waveforms obtained when the decision level is fixed.

FIGS. 6($d_1$) and 6($d_2$) show examples of the waveforms of the signal levels reproduced from the record pits on the surface of the optical card 1. These examples show that variations such as an overshoot and an undershoot take place around the boundary portion between the flat and pit portions and at the bottom of the pit. FIGS. 6($e_1$), 6($e_2$), 6($f_1$) and 6($f_2$) respectively illustrate a binary-coded waveform obtained when the level equivalent to $\frac{1}{2}$ of each of the upper reproduced limit of the flat portion and the lower reproduced limit of the pit portion are converted into a binary-coded decision level.

Figure 4A:
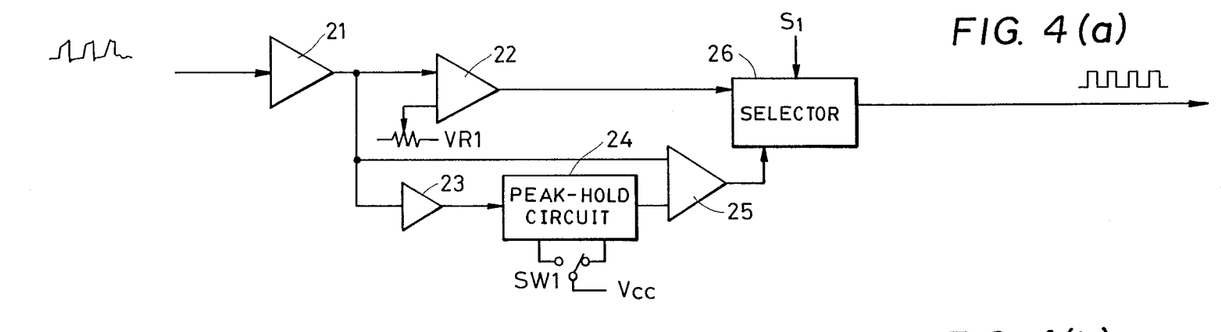

Referring to FIG. 4(a), reference numeral 21 denotes an amplifier for amplifying the reproduced signal supplied from the photodetectors 17, 18 and 19 which receive the beams reflected by the respective clock tracks $2_1$ to $2_n$, and reference numeral 22 denotes a comparator. A variable resistor VR1 is capable of setting a reference voltage (a threshold level) for the comparator 22, as desired. The output of the amplifier 21 is also delivered to a peak-hold circuit 24 through a buffer 23. The peak-hold circuit 24 determines, by the selective operation of a switch SW1, which peak should be held, the reproduced peak level of the flat portion or that of the bottom of the pit formed on the medium surface. If the peak level of the flat portion is held, the peak hold circuit 24 delivers to a comparator 25 the level equivalent to $\alpha$ ($0 < \alpha < 1$) times the thus-held peak level. If the peak level of the pit bottom is held, the circuit 24 delivers to the comparator 25 the level equivalent to $(1+\alpha)$ times the thus-held peak level.

The comparator 25 performs the binary-coding of the signal output by the amplifier 21 on the basis of the binary-coded decision level supplied from the peak-hold circuit 24, and the resultant binary-coded output becomes an input to a selector 26. The selector 26 selects either one of the outputs from the comparators 22 and 25. For instance, a given known data recorded on the optical card 1 (for example, a signal containing a binary data such as 1, 0, 1, . . . ) is reproduced, and on the basis of the reproduced data the selector 26 determines which is correct, the output data from the comparator 22 or that from the comparator 25, thereby selectively outputting the correct one. If the outputs from both comparators 22 and 25 are correct, the output having a greater pulse width is selected for the purpose of gaining a larger readout margin. In order to measure the pulse width, the number of clock signals is counted or the signals are input to a charging circuit and the level of the voltage output by the circuit is examined. A signal $S_1$ is a selection-enable signal, and only when the signal $S_1$ is supplied to the selector 26, selection is executed as described above, but when the signal $S_1$ is absent, the output data from the previously-selected comparator is held.

Figure 4B:
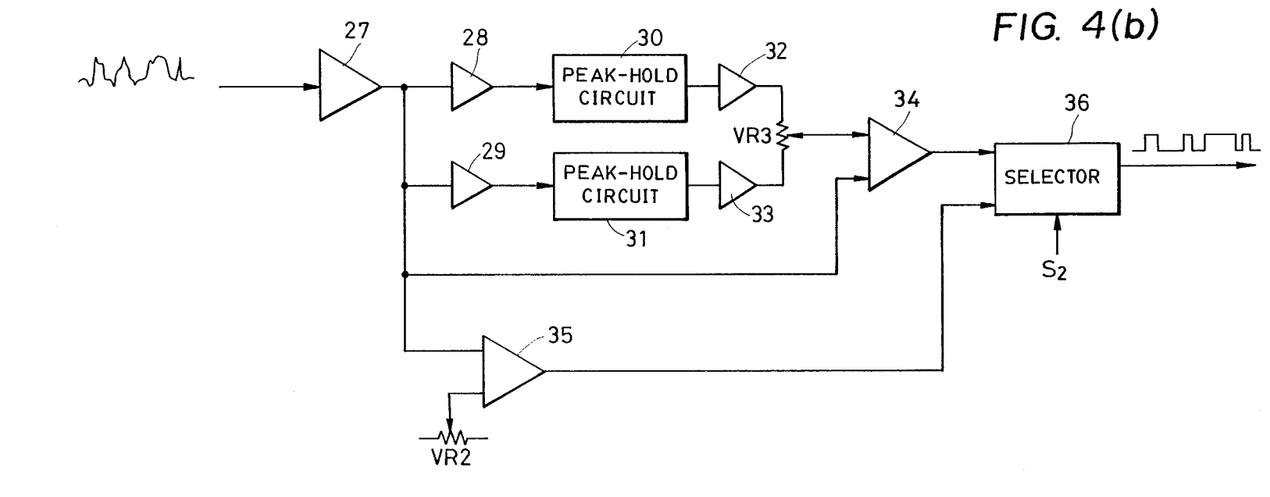

Referring to FIG. 4(b), an amplifier 27 amplifies the output from the photodetectors 17, 18 and 19 which receive the beams reflected by the tracking tracks $3_1$ to $3_n$ and the data tracks $4_1$ to $4_n$, and delivers a reproduced signal output to buffers 28, 29, a comparator 34 and a comparator 35 (which operates in the same manner as the comparator 22). A variable resistor VR2 sets a binary-coded decision level, in a similar manner to that of the variable resistor VR1. The output of the buffer 28 is delivered to a peak-hold circuit 30 which is arranged to hold the upper limit of the peak of a reproduced signal. The output of the buffer 29 is delivered to the peak-hold circuit $3_1$ which is arranged to hold the lower limit of the peak of a reproduced signal. The output sides of the peak-hold circuits 30 and 31 are connected to both ends of a variable resistor VR3 through buffers 32 and 33, respectively. When the variable resistor VR3 outputs the reproduced signal through its slide member, the level of the signal output is determined on the basis of such factors as the upper and lower peaks of the reproduced signal and the position of the slide member of the resistor VR3. Specifically, when the slide member is located at an intermediate point of the resistor VR3, the output from the slide member takes the corresponding intermediate level between the upper and lower peaks. Based on the level thus determined, the comparator 34 executes the binary-coding of the signal output by the amplifier 27 and delivers the binary-coded signal to a selector 36. Subsequently, as described above, a known pit data formed on the optical card 1 is reproduced, and on the basis of the reproduced data the selector 36 determines which is correct, the output data from the comparator 34 or that from the comparator 35, thereby selectively outputting the correct one.

As shown in FIG. 6($d_2$), when a threshold level is set at an intermediate point $T_{H4}$ between the upper and lower peaks, an unwanted pulse is produced as shown in FIG. 6($e_2$), and an erroneous output is thus provided. Accordingly, the selector 36 selects the output of the comparator 35 which is a binary-coded output shown in FIG. 6($f_2$). A selection-enable signal $S_2$ shown in FIG. 4($b$) functions in a similar manner to the signal $S_1$.

It should be noted that, since the level of the data reproduced from the record pit undergoes a variation greater than that of the data reproduced from the preformatted portion, the sensitivity of the peak-hold circuit for the record pit is made higher than that of the peak-hold circuit for the preformatted portion.

While the variable resistors VR1, VR2 and VR3 are used, an analog switch can also be used to automatically vary the decision level.

Although the entire circuit is analogously constructed, it may be digitally formed by utilizing analog-digital conversion.

Furthermore, while the circuit adopts a separated construction dedicated to the preformat and the record pit, respectively, a common circuit may be time-shared. The time-sharing operation is enabled by varying the threshold of a comparator and its timing is made identical to a switch timing between binary-coding circuits a and b described later.

Figure 7:
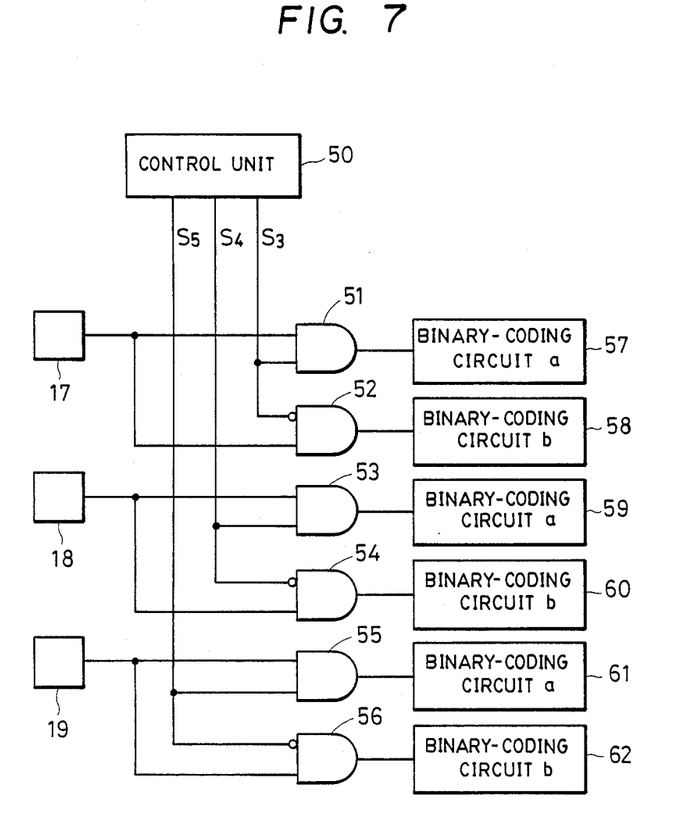
FIG. 7 is a block diagram showing the connection of each photodetector and the corresponding binary-coding circuits.

FIG. 7 shows a circuit construction through which each of the signal outputs by the photodetectors 17, 18 and 19 is delivered to the corresponding binary-coding circuits a and b. The signal outputs by the photodetectors 17, 18 and 19 are controlled by control signals $S_3$ to $S_5$ from a control unit 50 and gates 51 to 56, and are selectively delivered to either one of binary-coding circuits a and b corresponding to each photodetector. Specifically, when the control signals $S_3$ to $S_5$ take high levels, the binary-coding circuits a execute binary-coding while, when the signals $S_3$ to $S_5$ take low levels, the binary-coding circuits b execute binary-coding.

The binary-coding circuits a execute the binary-coding of, for example, the track numbers and the synchronizing signals recorded on the clock tracks $2_1$ to $2_n$. Accordingly, for information recording, when the track numbers and the synchronizing signals are to be read out, the binary-coding circuits a are selected. For information reproduction, when a desired track is to be retrieved or a track number is to be confirmed, the binary-coding circuits a are selected.

The binary-coding circuits b execute the binary-coding of, for example, signals recorded on the data tracks or recording regions $4_1$ to $4_n$. For information reproduction, when the signals recorded on the data tracks are to be read out, the binary-coding circuits b are selected.

Also, since the signals recorded on the tracking tracks $3_1$ to $3_n$ do not undergo substantial level variation, either of the binary-circuits a and b may be employed.

As shown in FIG. 7, in this embodiment, each pair of the binary-coding circuits a and b is disposed on the output side of the respective photodetectors 17 to 19. However, if it is unnecessary to simultaneously actuate the circuit pair, a common binary-coding circuit is substituted for each pair.

As will be understood from the previous description, for information recording (during the forward movement of the optical card 1), the binary-coding circuits a are consistently selected. When recorded information is to be confirmed or verified (during the reverse movement of the optical card 1), the binary-coding circuits b are switched.

For information reproduction, the binary-coding circuits a are selected only when a reproduction-starting track is to be detected, and after the reproduction-starting track has been detected, the binary-coding circuits b are switched so as to read out the signals recorded on the data tracks. When a track number is to be confirmed during the readout of the signals from the data track, the binary-circuits a are switched.

There is also a format in which a track number is prerecorded at the first position of each data track. In this case, the binary-coding circuits a need to be switched to the binary-coding circuits b at the time that the readout of a record pit is started on the data track.

The change-over between the binary-coding circuits has only to be performed in correspondence with the signal supplied from a required photodetector.

It will be readily understood by those skilled in the art that, while reference is made to the binary-coding of data in a combination system of the phase and reflection types in the above description of the embodiment, the present invention can be adapted to the binary-coding of data in a combination system of the phase type or that of the reflection type. In addition, this invention can be applied to the processing of waveforms reproduced by a light beam having greatly different intensity or reproduced waveforms having a different evenness.

While the above provides a full and complete disclosure of the invention, various modifications, alternate constructions and equivalents may be employed without departing from the true spirit and scope of the invention. Therefore, the above description and illustrations should not be construed as limiting the scope of the invention, which is defined by the appended claims.

What is claimed is:

1. An information reproducing apparatus comprising:
    a recording medium having different types of first and second information recorded in a manner different from each other;
    reading means for reading out said information recorded on said recording medium and outputting a signal;
    shaping means for shaping the waveform of said signal output by said reading means; and
    switching means for switching shaping mode of said shaping means in accordance with each type of information to be read out by said reading means.

2. An information reproducing apparatus according to claim 1, wherein said recording medium is constituted by an optical recording medium.

3. An information reproducing apparatus according to claim 2, wherein said first information is recorded by lithography, and said second item of information is recorded by the irradiation of a light beam.

4. An information reproducing apparatus according to claim 3, wherein said recording medium has a plurality of recording tracks, said first information has a track number which is preformatted on said recording medium, and said second information has information recorded on said recording tracks by the light beam.

5. An information reproducing apparatus according to claim 2, wherein said reading means includes light beam generating means for irradiating a light beam to said recording medium.

6. An information reproducing apparatus according to claim 1, wherein said shaping means converts an analog signal outputted from said reading means into a digital signal.

7. An information reproducing apparatus according to claim 6, wherein said shaping means includes a plurality of analog-digital converting means and said switching means selects one of said plurality of analog-digital converting means in accordance with each type of information to be read out by said reading means.

8. An information reproducing apparatus according to claim 6, wherein said switching means varies a threshold value for converting an analog signal into a digital signal in accordance with each type of information to be read out by said reading means.

9. An information reproducing apparatus according to claim 1, wherein said first and second information is recorded on the same recording medium.

10. An information reproducing apparatus according to claim 1, said apparatus further comprising means for recording said second information on said recording medium.

11. An information reproducing apparatus according to claim 1, wherein said reading means is provided commonly to read out said first and second information.

12. An information reproducing apparatus comprising:

a recording medium having different types of first and second information signals recorded in a manner different from each other;

reading means for reading out said information signals recorded on said recording medium and outputting a signal;

reproducing means for reproducing said information signals from said signal outputted by said reading means; and switching means for switching reproducing mode of said reproducing means in accordance with each type of information to be read out by said reading means.

13. An information reproducing apparatus according to claim 12, wherein said reproducing means includes means for converting an analog signal into a digital signal and said switching means switches a threshold value of said converting means.

14. An information reproducing apparatus according to claim 13, wherein said reproducing means includes a plurality of converting means, and said switching means selects one plurality of converting means.

15. An information reproducing apparatus according to claim 12, wherein said recording medium is constituted by an optical recording medium.

16. An information reproducing apparatus according to claim 15, wherein said first information signal is recorded by lithography, and said second information signal is recorded by the irradiation of a light beam.

17. An information reproducing apparatus according to claim 16, wherein said recording medium has a plurality of information recording tracks, said first information signal has a track number which is preformatted on said recording medium, and said second information signal has an information signal recorded on said recording tracks.

18. An information reproducing apparatus according to claim 15, wherein said reading means includes light beam generating means for irradiating a light beam to said recording medium.

19. An information reproducing apparatus according to claim 12, wherein said reading means outputs a first signal corresponding to said first information signal and outputs a second signal corresponding to said second information signal, and said reproducing means reproduces said first information signal from said first signal and reproduces said second information signal from said second signal.

* * * * *